Jan. 4, 1938.   R. SOMMER   2,104,532
NONSKID TIRE
Filed Nov. 2, 1933   3 Sheets-Sheet 1

Jan. 4, 1938.    R. SOMMER    2,104,532
NONSKID TIRE
Filed Nov. 2, 1933    3 Sheets-Sheet 2

Inventor:

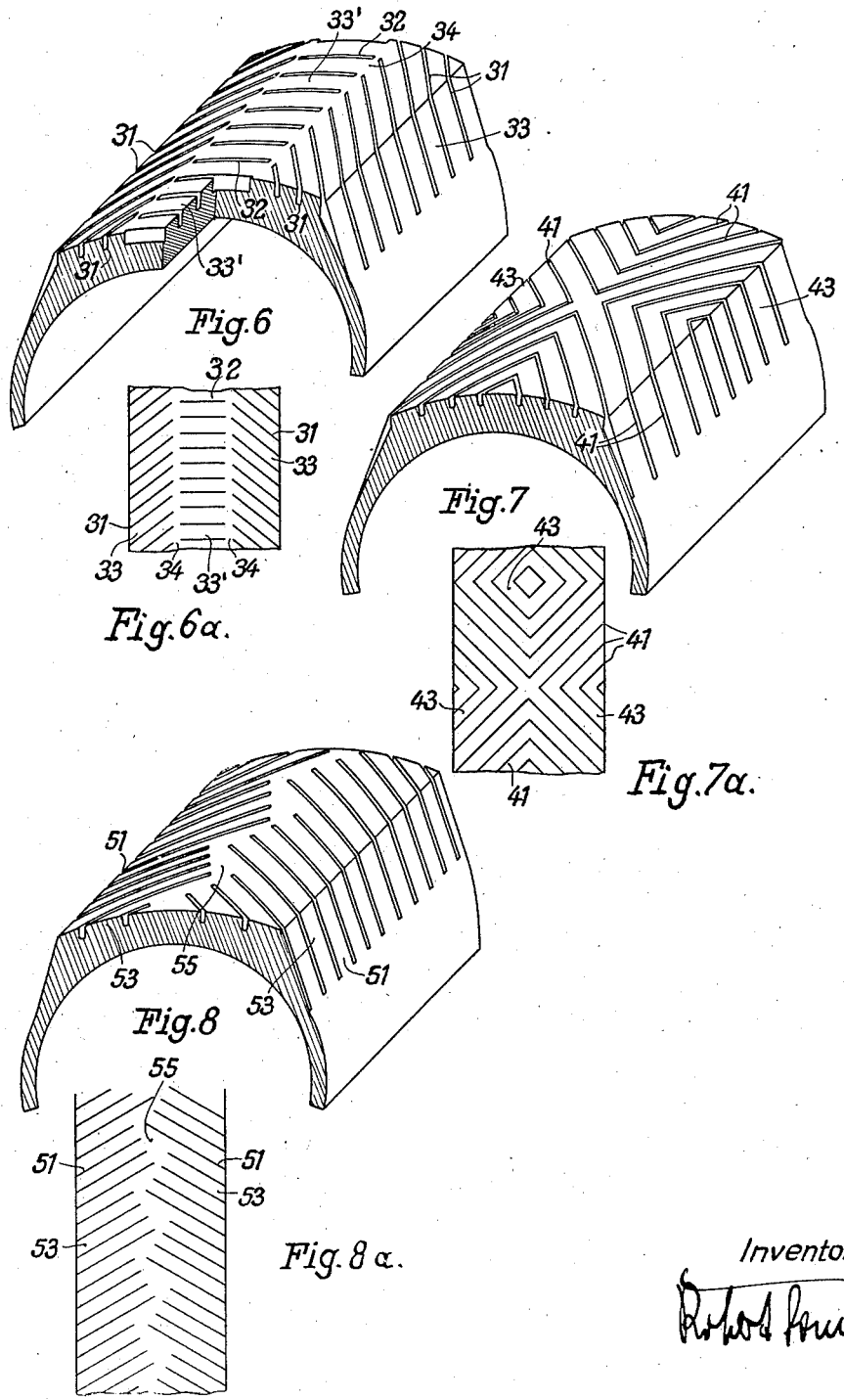

Patented Jan. 4, 1938

2,104,532

UNITED STATES PATENT OFFICE 2,104,532

NONSKID TIRE

Robert Sommer, Berlin, Germany, assignor of one-half to Walter S. Bleistein, New York, N. Y., and one-fourth to Bruno Cossalter, Feltre (Belluno), Italy Application November 2, 1933, Serial No. 696,324
In Germany November 4, 1932

10 Claims. (Cl. 152—14)

This invention relates to an improved tire tread for vehicles of all kind as f. i. bicycles, motor bicycles, automobiles and the like, which as well known, are subjected to a high danger of skidding and sliding on wet roads.

I shall describe the invention as applied to an automobile tire, since I believe that the principal line of application of the invention will be with tires of motor vehicles.

The object of my invention is to provide a tread which has no tendency of skidding or sliding on a wet or slippery road.

The sliding and skidding of vehicles on wet roads is primarily caused by the fact that the pavement, particularly the pavement with a watertight smooth surface as f. i. the very dangerous stamped asphalt, has a very low coefficient of friction if it is wet. In consequence thereof, the wheels of the vehicles do no more constantly roll as on a dry road, but tend to slide in the direction of the drive. Under these circumstances, braking becomes nearly impossible even over a considerable distance while braking over a short distance is a requirement of safety. This property of the various makes of pavement is very remarkable since that pavement which is the most dangerous one in a wet state may when dry have a coefficient of friction between 0.6 and 0.8, that is to say a coefficient of friction just as high as many other less dangerous types.

The dangerous slipperiness mostly results from a thin film particularly consisting in a lime or clay mud of a certain viscosity which keeps on being formed in wet weather from the particles worn off the pavement as well as from dust, dirt, oil, etc. With tires of a type hitherto known, such an intermediate layer lies between the surface of the tire tread and the pavement since the viscous film does not give way under the wheel. This causes the aforementioned skidding and sliding of the vehicles, particularly of the motor vehicles, with the consequence that on wet roads the speed must be reduced greatly, and even then the degree of safety will not be quite the same as in dry weather.

Now I have found that, speaking in a general manner, the dangerous sideways skidding is preceded by a sliding instead of a proper rolling of a wheel in the direction of its plane, i. e. substantially in the direction of the driving. If such sliding occurs even a slight side force resulting f. i. from an unevenness of the pavement, from a one sided load of the vehicle, from unequal braking etc. suffices for causing a vehement sideways skidding, because, in accordance with a well known physical law, a body once being in the state of sliding will be thrown off its path by the very smallest force.

Starting from these facts I make a tire so that its tendency to slide in the direction of driving is primarily eliminated, and my invention consists in a tire tread provided with a novel type of alternating grooves and ribs or projections of relatively small width which run across the wheel plane and are substantially radial thereto. Such ribs split the mud layer at the moment they engage it, because each rubber rib or projection of the tire is capable of being deformed towards the next rib under the load on account of the small width and of the elasticity of the rubber. The ribs may be tilted over partly or entirely in such a manner that always a sharp projecting edge will cut into the mud layer. Thereby, the mud film will be so dislodged along the grooves that the ribs positively engage the firm rough pavement, i. e. without an intermediate mud film.

Such cutting and dislodging of the mud layer does not take place with well known tread designs composed of large projections or blocks and of cavities or relatively wide grooves of zigzag or other shape, especially not when using broad ribs and grooves located in the plane of the wheel or parallel thereto. Such tread designs are not adapted to eliminate the danger of skidding, because they do not help to catch the evil at its root as they cannot prevent the sliding of the wheel in the direction of the driving.

Although I have given an explanation of the useful effect of the tread according to my invention in the foregoing I wish it to be understood that I do not know whether my theory as stated above is the only correct one, and that possibly other reasons may be advanced better explaining the laws of nature which cause the non-skidding quality of my tire tread.

As stated above the ribs and grooves of my tire tread are relatively small in width, that is, they are narrower than those of conventional tires of equal size, and the width of the grooves and ribs of my treads is smaller with tires of small size than with tires of larger size. The depth of the grooves depends upon the size of the tire and its normal load. In any case, each groove is to be considerably smaller in width than the adjacent ribs. I have found it preferable to make the relation of the width of the grooves to the width of the ribs approximately between ¼:3 and 5:10 (in special cases 15) millimeters. In other words, the relation of groove width to rib width will range between about 1 to 12 and about 1 to 2, while the groove width will range between about ¼ and 5 millimeters, and the rib width between about 3 and 15 millimeters. For instance, a rib width of 3 millimeters will correspond to a width of the neighboring groove of ¼ millimeter, and if the rib is made 10 millimeters wide then the adjacent groove may have a width of about 5 millimeters. The smaller dimensions are to be used for tires of smaller size, and the larger dimensions for tires of larger size, approximately as the tire diameters range between a conventional minimum and maximum. The depth of the grooves is preferably between 1 and 6 (in special cases 10) millimeters.

It will be understood my invention can be employed not only when making new tires but also on tires which have or had any original kind of tread. In the first case, the producer of tires may provide the ribs and grooves as per my invention from the start, in the second case, a tire having a tread of comparatively large blocks and cavities of any shape may be subsequently provided with grooves according to my invention intersecting the original tread design, or if the original tread design should be entirely worn off the grooves may be provided in the remaining solid rubber without, however, injuring the fabric layer of the tire. I have found that the thickness of the rubber on top of the fabric layer may be very small. In fact, it is sufficient if there remains a solid rubber layer of about 1½ to 2 millimeters between the top fabric layer and the bottom of the grooves.

This gives the possibility of repeatedly (for instance three times) providing the tread with new grooves if the ribs of the original non-skid tread are so much worn off that they have no more satisfying effect.

I have furthermore found out that the wear of tires with my tread is greatly reduced if the width of the groove and the ribs is so chosen under consideration of the load of the wheel that each rib which is engaging the ground while the wheel is turning may be sufficiently deformed to lean against the next rib. In this manner, the ribs are capable of supporting one another, and hence it follows that grooves of small width are to be preferred. The two flanks of the same rib, that is to say, those surfaces of such rib which form walls of two neighboring or successive grooves, are substantially parallel to each other. With this arrangement, the tread surfaces of adjacent ribs will be staggered in somewhat step-like fashion when one or both of these ribs are deformed under load as above referred to, and thus the edge of one rib will project beyond the adjacent rib and form a ridge to prevent longitudinal slipping of the wheel. Experiments have proven that tires with treads made in this manner have less wear than tires with conventional treads, which result may be explained by the fact that no sliding takes place.

It is by no means necessary that all grooves and all ribs of the same tire have equal sizes. Width, depth and distance of the grooves may vary to one's liking if only they are within the above stated limits. The grooves may be running through from side to side of the tire or they may be interrupted. They may be arranged in parallel lines and at right angles with the plane of the tire or angularly to one another and slanting to the plane of the tire. I, however, prefer the arrangement of parallel grooves and ribs running from one side to the other one at right angles to the plane of the tire.

My invention will be more clearly described in detail hereafter and reference is made to the accompanying drawings which illustrate preferred modes of carrying my invention into effect:—

Figs. 2 to 6 are similar views of other embodiments of the invention.

Figs. 6 to 8 are perspective views of other embodiments of the invention with grooves running at angles other than right angles with the plane of the tire.

Figs. 6a to 8a are schematical plan views of the designs of Figs. 6 to 8.

Fig. 9 is a view of a tire with a conventional design of the tread into a part of which grooves are cut to make the improved tread.

Fig. 10 is a sectional view of a tool for cutting grooves into a conventional tire.

Figure 1:
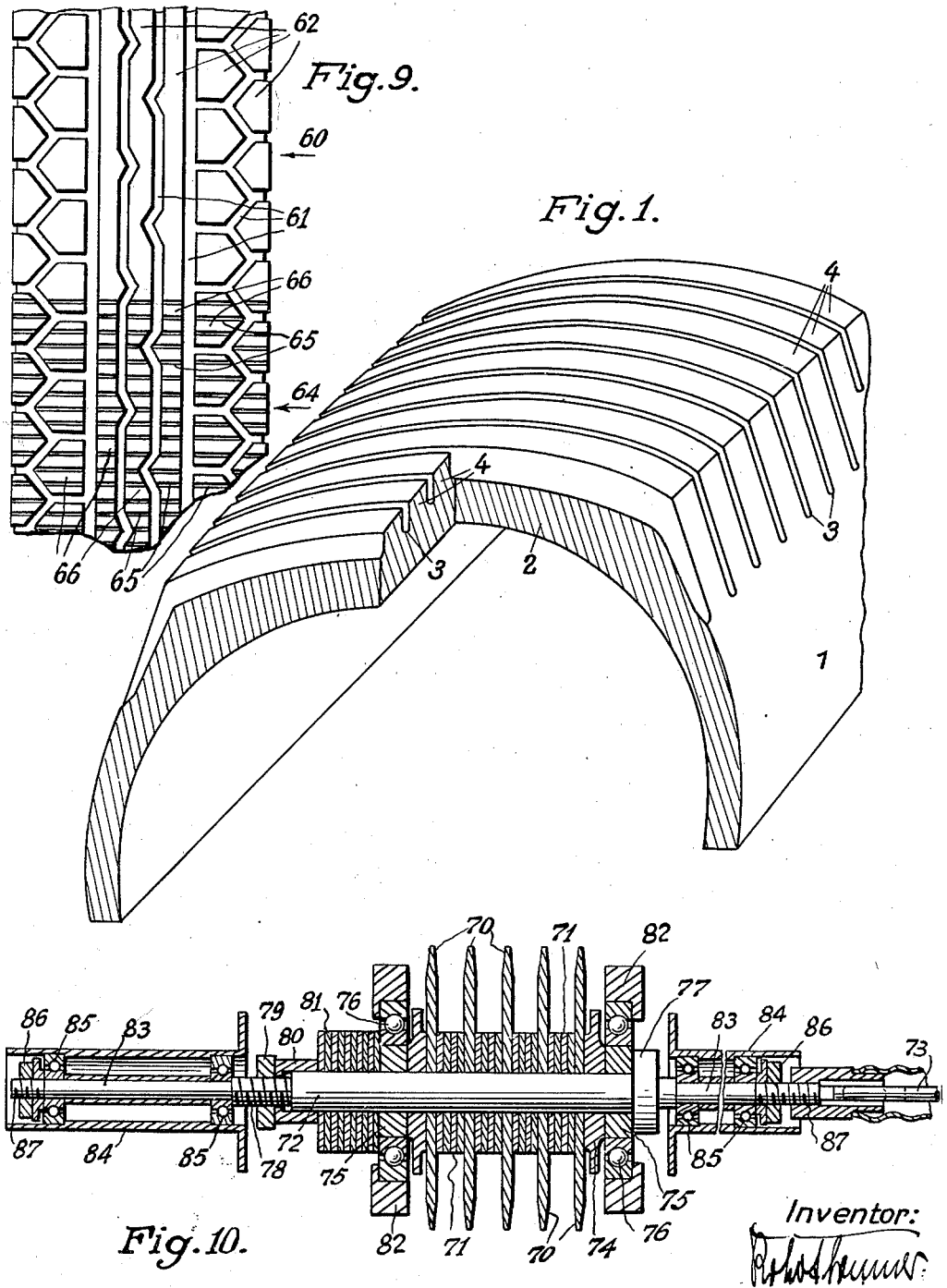
Fig. 1 is a perspective view partly in section of a tire with a tread in the preferred form.

In Fig. 1 the tire cover 1 is provided with grooves 3 running through from the one side of the tread to the other side at right angles with the plane of the tire. With the exception of the improved tread, the tire may be of any conventional type and is, therefore, illustrated only as far as necessary for disclosing the invention. Between each two grooves 3 a rib 4 is projecting. As well the grooves 3 as the ribs 4 are shown in parallel lines and equally distanced from one another. The grooves 3 have smaller width than the ribs 4. As to the preferable dimensions I refer to what is stated above. The ribs 4 which will engage the pavement are capable of being deformed and/or of being tilted over partly or entirely.

Figure 2:
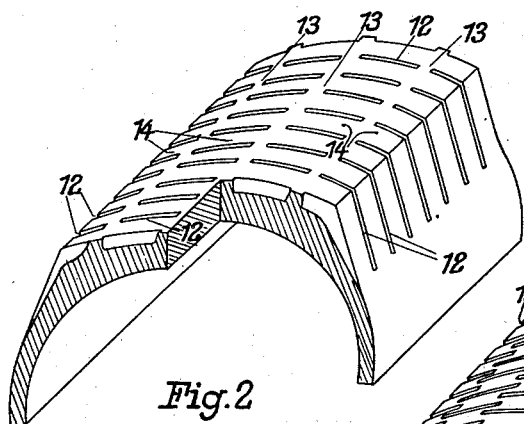

In the embodiment of Fig. 2 the grooves are interrupted in such a manner that they form sections 12 of grooves between which longitudinal ribs 13 and cross ribs 14 remain projecting.

Figure 3:
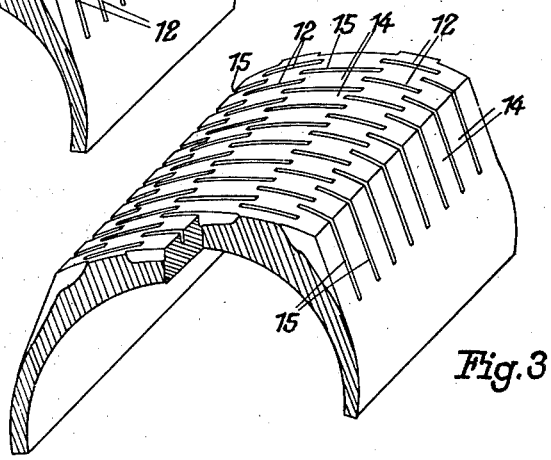

In Fig. 3, the grooves and the cross ribs 14 are arranged in a similar manner as in Fig. 2 with the difference, however, that the groove sections 12 overlap, or are echeloned relatively to, the groove sections 15 to preferably extend into the ribs between the groove sections 15.

Figure 4:
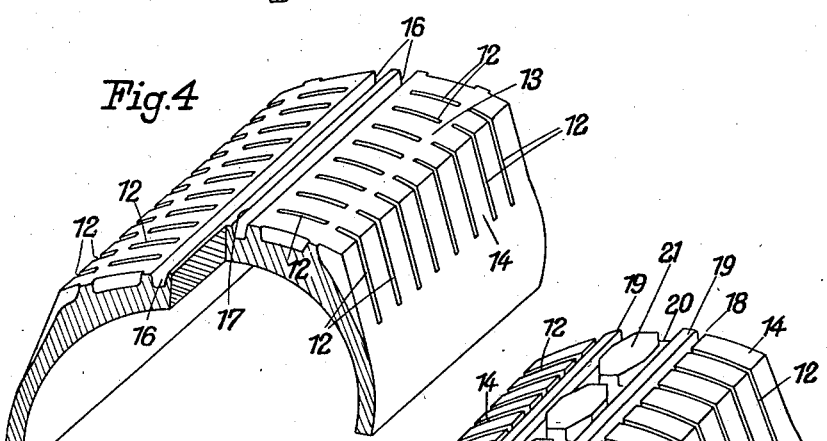

The tread of Fig. 4 corresponds to that of Fig. 2. In addition, however, to grooves 12 the tread is provided with two grooves 16 arranged parallel with the plane of the tire and flanking or forming a rib 17.

Figure 5:
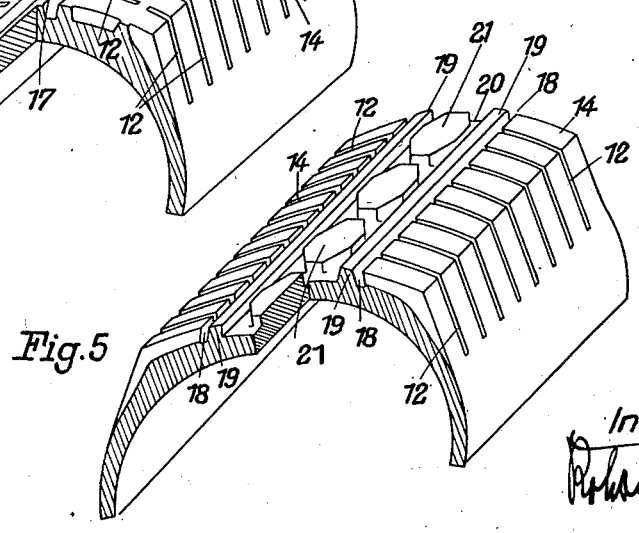

The tread as per Fig. 5 has two longitudinal grooves 18 and therebetween one groove 20 which is wider than grooves 18. Between each groove 18 and groove 20 there is a longitudinal rib 19. A series of separate blocks 21 is provided within groove 19.

The tread of Figures 6 and 6a has slanting grooves 31 forming ribs or projections 33. These are arranged symmetrical to the center plane of the tire. In this center plane, however, there are cross grooves 32 between which ribs 33' project. Between the neighboring ends of the slanting grooves 31 and the cross grooves 32, there is a rib 34 of small width. A rib 34, however, is not necessary. In other words, grooves 31 may be made to form the continuations of grooves 32.

The embodiment of the invention as per Fig. 7 is provided with only slanting grooves and ribs arranged in a manner to form symmetrical designs. The grooves 41 as well as ribs 43 meet one another at angles of 90° and enclose angles of about 45° with the plane of the tire.

The tread of Figs. 8 and 8a has only slanting grooves 51 and ribs 53 running from the sides of the tire to its center plane in opposite directions. The grooves 51 slant at an angle of more than 45° to the plane of the tire, and as a result of this, if we resolve a strain exerted lengthwise of the ribs into two components, one in the plane of the tire and the other at right angles to such plane, the longer of these components will be at right angles to the plane of the tire, and the resistance to longitudinal skidding will thus be greater than if such transverse component were the shorter one. The grooves are of different length in such a manner that in the center plane of the tire a zigzag stripe exists which may be defined as a rib of small width substantially running parallel with the center plane of the tire.

Although I have shown various designs and embodiments of my invention, and although the expert will be able to find other designs and embodiments of the invention also useful, I prefer that disclosed with reference to Fig. 1, since it is the most simple and a very efficient one. Besides, it may be easily cut into any existing tire, no matter whether or not such tire has been in use, and whether or not the original tread design has been worn off partly or entirely.

To illustrate this, Figure 9 shows a tire with the original tread design 60 of a conventional type. This design is formed by the zigzag cavities 61 of relatively large width and projecting portions 62 on the surface on which the wheel will roll. The lower part 64 of Figure 9 shows how grooves 65 of small width and at a small distance from one another are cut into the projecting portions 62. The grooves 65 may be shallower or deeper than or equally deep as the cavities 61 depending upon the wear of the tire, because their depth should be within the limits stated above. The grooves 65 partition the projections 62 into a plurality of sections 66 in the shape of ribs of small width which may be easily deformed and tilted over under the load. It is obvious that these sections 66 take the place of the ribs 4 of Fig. 1.

In order to provide an existing tire with the improved tread I mount the tire on a wheel and inflate it. I may take for this purpose one of wheels proper of the car which is to be fitted with tires having the improved tread. Then I take a power driven cutter of the width wanted for the grooves and move such cutter across the tire from its one side to its other side.

In order to obtain grooves of the desired depth I join to the one side or to both sides of the cutter a gauge disc of such diameter that the difference of the outer radii of the cutter and the disc corresponds to the desired depth of the grooves. It is to be preferred to employ two gauge discs equally distant from the cutter, because these two discs help to ensure a true radial incision. I, however, wish to emphasize that it is by no means necessary that the grooves be cut in radial planes. In certain cases, it may be advisable to cut the grooves at an angle with the radial planes in order to facilitate the tilting over of the ribs.

After the first incision has been made the cutter will be retracted so as to bring it back to its initial position, on the same side of the tire from which the cut was started, and then cutter and the wheel with the tire will be peripherically moved relative to one another for a distance equal to the desired width of the ribs, and the next incision will be made. This will be continued until the new tread is completed.

It is to be preferred to use a multiple cutter as illustrated in Fig. 10 in the place of a single cutter. This multiple cutter consists of a plurality of cutter discs 70, which are separated from one another by distance plates 71. The cutter discs 70 and the plates 71 are secured to a power driven shaft 72 connected by a flexible shaft 73 with a motor not shown. Two more distance plates 74 are provided at both ends of the set of cutter discs 70 and furthermore two rings 75 carrying roller bearings 76. Shaft 72 has a collar 77 and a screw thread 78 with nut 79. Between the left hand ring 75 and the nut 79 distance pieces 80 and 81 are interpositioned. All discs, plates and distance pieces can be pushed on shaft 72 from the left and pressed against the collar 77 by means of the nut 79. The roller bearings 76 carry the gauge plates or rings 82. The cutter discs, distance plates and pieces and the gauge rings are exchangeable in such a manner that the width of the grooves and ribs, as well as the depth of the grooves to be cut with the tool may be altered.

Shaft 72 has two extensions 83 on which two tube like handles 84 are mounted by means of roller bearings 85. These handles are kept in their places by means of nuts 86 screwed on threads 87 of the extensions 83 of shaft 72. In order to exchange the cutters it is only necessary to at first remove the left hand nut 86 and handle 84 with the pertaining roller bearings 85, and thereafter unscrew nut 79. Then the various distance pieces and plates and cutter discs are free for removal.

Many alterations may be made within the scope of my invention.

The grooves and ribs of the tread may be arranged to form any design if only they correspond to the requirements as stated above with regards to their width and depth and to the capability of the ribs to be deformed or tilted over under the load of the wheel.

What I claim is:—

1. A pneumatic tire for vehicles, having a tread with alternating substantially radial grooves and ribs parallel to one another, said grooves and ribs extending substantially at right angles to the central plane of the tire, and the relation of groove width to rib width being such that upon the tire rolling under load, the ribs will be deformed so that one edge of a rib closes the adjacent groove and supports the other rib adjacent said groove and the other edge is adapted to cut into the surface on which the tire is rolling.

2. A pneumatic tire for vehicles, and particularly motor vehicles, having a tread with alternating grooves and ribs parallel to one another, said grooves and ribs extending substantially at right angles to the central plane of the tire, and the groove width ranging between about ¼ and 5 millimeters, while the rib width ranges between about 3 and 15 millimeters, the relation of groove width to rib width being such that upon the tire rolling under load, the ribs will be deformed so that one edge of a rib closes the adjacent groove and supports the adjacent rib, and the other edge is adapted to cut into the surface on which the tire is rolling.

3. A pneumatic tire for vehicles as claimed in claim 2, in which the two flanks of the same rib are substantially parallel to each other.

4. A pneumatic tire as claimed in claim 2, in which the depth of the grooves ranges between 1 and 10 millimeters.

5. A pneumatic tire for vehicles and particularly motor vehicles, having a tread with projections and cavities, said projections being subdivided by substantially radial grooves extending substantially at right angles to the plane of the tire into ribs alternating with such grooves and parallel thereto, the relation of the groove width to the rib width being such that upon the tire rolling under load, the ribs will be deformed so that one edge of a rib closes the adjacent groove and the other edge is adapted to cut into the surface on which the tire is rolling.

6. A pneumatic tire as claimed in claim 5, in which the groove width ranges between about ¼ and 5 millimeters while the rib width ranges between about 3 and 15 millimeters.

7. A pneumatic tire having minutely spaced transverse grooves in its tread, said grooves being spaced apart from one and one-half to fifteen times their widths thereby defining strips which tilt under tangential strain to cause one side of a strip under strain to contact with the adjacent side of the adjacent strip and present the opposite edge of the strip to the roadway angularly.

8. A pneumatic tire having minutely spaced rectangular transverse radial grooves in its tread of greater depth than width thereby defining strips which tilt under tangential strain to cause one side of a strip under strain to contact with the adjacent side of the adjacent strip and present the opposite edge of the strip to the roadway angularly.

9. A pneumatic tire for vehicles, having a tread with a first groove substantially parallel to the central plane of said tire, and alternating substantially radial ribs and second grooves extending substantially at right angles to the central plane of said tire, said second grooves terminating at one of their ends in said first groove, and the relation of the width of said second grooves to the width of said ribs being such that upon the tire rolling under load the ribs will be deformed so that one edge of a rib closes the adjacent second groove and supports the other rib adjacent said second groove and the other edge is adapted to cut into the surface on which the tire is rolling.

10. A pneumatic tire for vehicles, having a tread with a plurality of laterally spaced first grooves substantially parallel to the central plane of said tire, and alternating substantially radial ribs and second grooves extending substantially at right angles to the central plane of said tire, each of said second grooves ending in at least one of said first grooves, and the relation of the width of said second grooves to the width of said ribs being such that upon the tire rolling under load the ribs will be deformed so that one edge of a rib closes the adjacent second groove and supports the other rib adjacent said second groove and the other edge is adapted to cut into the surface on which the tire is rolling.

ROBERT SOMMER.